United States Patent Office 3,565,990
Patented Feb. 23, 1971

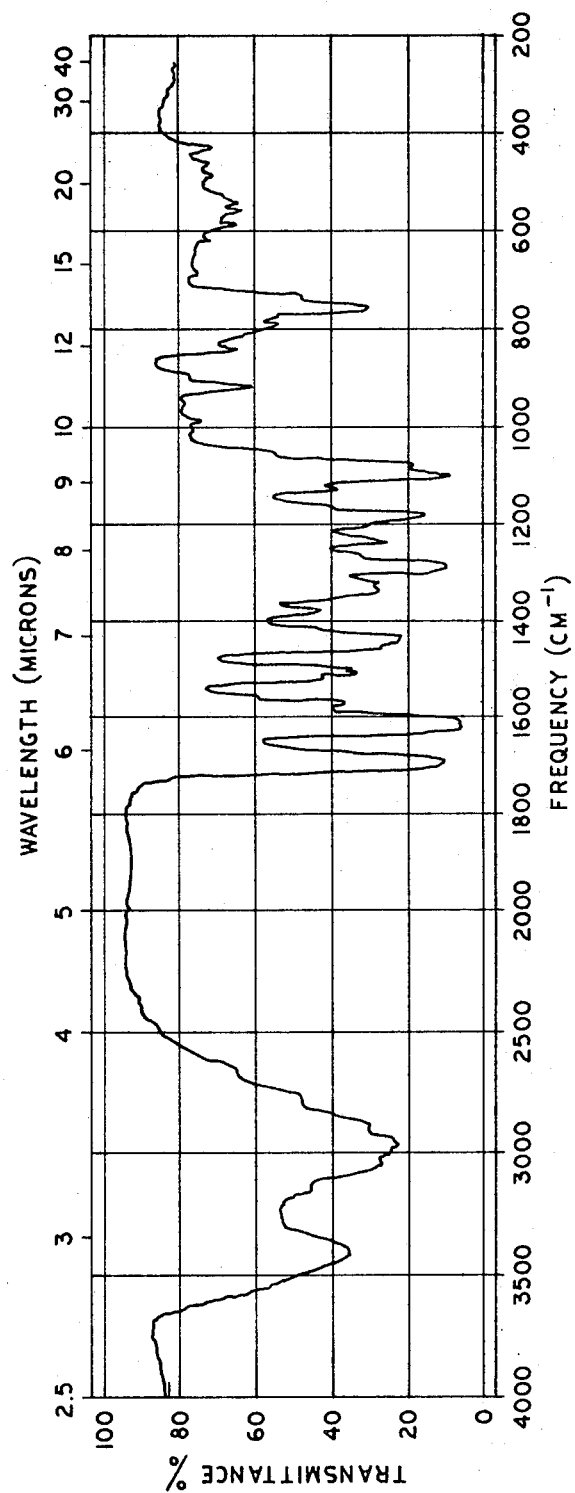

3,565,990
BLOOD PRESSURE LOWERING SUBSTANCE
Alfred Groebel, Bad Soden, Taunus, and Ernst Lindner, Frankfurt am Main, Germany, assignors to Farbwerke Hoechst Aktiengesellschaft vormals Meister Lucius & Bruning, Frankfurt am Main, Germany, a corporation of Germany
Filed Feb. 13, 1968, Ser. No. 705,182
Claims priority, application Germany, Feb. 16, 1967, F 51,540
Int. Cl. A61k 27/14
U.S. Cl. 424—195                          2 Claims

ABSTRACT OF THE DISCLOSURE

A pharmacologically active substance having blood pressure lowering activity, isolated from *Cabucala madagascariensis* and a process for isolating said substance from the plant material by alcohol extraction.

---

The present invention provides a pharmacologically effective substance and a process for isolating it.

We have found that a crystalline substance having long lasting blood pressure lowering activity with only insignificant modification of the venous pressure, of the electrocardiogram, of the respiration and of the heart frequency, can be isolated from *Cabucala madagascariensis*.

*Cabucala madagascariensis* is a shrub belonging to the family Apocynaceae and is found in the sclerophilic woods of the western coast of Madagascar. The shrub is discussed by M. Pichon in "Notulae Systematicae," Vol. XIII (1948), pages 202–203.

The substance is obtained by subjecting dried material of *Cabucala madagascariensis*, preferably the stems thereof, if necessary after previous extraction to remove fats, waxes and sterols, to an extraction with a lower alcohol and by purifying the extract by chromatography. An especially advantageous method consists in liberating the plant extract from solvent, extracting the dry residue with dilute acids, rendering the acid solution alkaline, extracting with ether or a halogenated hydrocarbon, dissolving the separated precipitate in a lower alcohol and purifying the clear alcoholic solution by chromatography.

The active substance may also be isolated from the plant material by extraction with water, but the yields obtained by this method are smaller and the extracts contain a higher proportion of impurities.

The active substance is contained preponderantly in the stems of *Cabucala madagascariensis*; leaves and roots of the plant contain the active substance in considerably smaller proportions. It is advisable first to remove the major part of plant fats, waxes and sterols by extraction, for example wtih petroleum ether. For the extraction of the active substance a lower alcohol, preferably methanol or ethanol, is used. According to a preferred method, the extract obtained is then freed of solvent in known manner, for example, by removing the solvent by distillation under reduced pressure or under ordinary pressure. The last traces of solvent can be eliminated by drying in a high vacuum or in a drying chamber. From the solid residue the active substance is then extracted by treatment with a dilute acid. As such an acid, for example, hydrochloric acid, sulfuric acid or acetic acid may be used; hydrochloric acid or sulfuric acid is especially used. The acid is preferably of a concentration from 0.1 N to 2 N; the use of an acid having a higher concentration yields extracts which contain a higher proportion of decomposition products and, therewith, impurities.

The acid solution is then rendered alkaline, for example, by means of caustic potash or caustic soda, the pH-optimum being in the range of 8 and 9. The yellow brown precipitate which then separates is collected, then at first liberated from the or with a halogenated hydrocarbon, preferably an aliphatic halogenated hydrocarbon, or with a, preferably aliphatic, halogenated hydrocarbon such as methylene chloride, preferably chloroform, and finally subjected to an extraction with a lower alcohol such as methanol or ethanol. The extractions may be carried out, for example, in a Soxhlet extractor. Upon evaporation of the alcoholic extract, there is obtained an amorphous residue which is the carrier of the strong blood pressure lowering activity. Further purification of this residue can be effected, for example, by adsorption chromatography. As adsorbent, silica gel or neutral aluminum oxide (Woelm) is preferably used; as eluants, the systems chloroform/acetone and benzene-acetone have proved suitable.

Upon evaporation of the eluate, a yellow crystalline odorless substance is obtained which, after drying over phosphorus pentoxide, melts at 268–270° C. Osmometric determination in methanol revealed a molecular weight of 252. Quantitative analysis yielded the following values:

|   | Percent |
|---|---|
| C | 58.3–58.6 |
| H | 5.8–6.0 |
| O | 28.9–29.2 |
| N | 6.5–6.7 |

The substance is furthermore characterized by the following physical data.

Thin-layer chromatography:

$R_f$-value: 0.76 (adsorbent: $SiO_2$; system: ethyl acetate/butanone/formic acid/water, 5:3:1:1).

$R_f$-value: 0.82 (adsorbent: $SiO_2$; system: i-propanol/water/2 N-hydrochloric acid, 25:5:1).

Ultraviolet spectrum (in methanol):
$\lambda\ Max_1=244\ m/\mu$ (1 g. $I/I_0=0.98$; 1 g. $\epsilon=5.3927$).
$\lambda\ Max_2=304\ m/\mu$ (1 g. $I/I_0=0.57$; 1 g. $\epsilon=5.1581$).
$\lambda\ Max_3=366\ m/\mu$ (1 g. $I/I_0=0.045$; 1 g. $\epsilon=4.0596$).
Infrared spectrum (in KBr): see accompanying drawing.

The substance forms stable salts with acids, for example with sulfuric acid.

The reactions with Dragendorff's reagent (bismuth carbonate + sodium iodide in glacial acetic acid and ethyl acetate, addition of tartaric acid), iodine and Reinecke salt are positive.

The substance has an excellent blood pressure lowering activity. For example, it provokes in a dog, when administered in a dose of 0.5 mg./kg. of body weight, an average reduction of the blood pressure of 75 mm. which is not yet compensated after 30 minutes. When administered in a dose of 1 mg./kg. of body weight, the lowering is 70 mm. and lasts for 45 minutes. 2 mg./kg. provoke an average reduction of 60 mm. which is not yet compensated after 3 hours. Venous pressure, electro-cardiogram and frequency of respiration are not influenced, while the heart frequency is influenced insignificantly only. The $LD_{50}$ in the white mouse, upon intravenous application, is 25 mg./kg.

Owing to its excellent blood pressure lowering properties, the new substance is generally suitable for the treatment of cardiac and circulatory disorders, for example, in the case of chronical hypertonia, cardiac insufficiency, Angina pectoris and disorders of the blood circulation. The substance can be administered orally or intravenously; the dose ranges from about 20 to 40 mg. in the case of intravenous administration and from about 40 to 80 mg. in the case of oral administration, depending on the weight of the patient and on the severity of the disease.

For oral administration, especially tablets or dragees may be used which contain the active substance in a quantity ranging from 10 up to 50 mg. per dosage unit, in addition to the usual adjuvants and carriers such as talc, starch, lactose, etc. For intravenous administration, solutions of the substance in water with addition of a solubilizer such as propylene glycol or solutions in propylene glycol solutions in propylene glycol are preferably used.

The following examples illustrate the invention but they are not intended to limit it thereto:

EXAMPLE 1

700 g. of dried and ground stems of *Cabucala madagascariensis* were extracted in a Soxhlet extractor successively with each time 2 liters of petroleum ether and methanol. The methanolic solution was filtered and evaporated to dryness under reduced pressure. The residue (34.2 g.) was stirred vigorously, at 35–40° C., with 200 ml. of 0.5 N-sulfuric acid. The mixture was then filtered with suction through a filter layer (Seitz filter K3). The clear deep red-brown filtrate was adjusted to pH 8–8.5 by slow addition, with stirring, of solid caustic soda. A yellow brown precipitate separated which was filtered off with suction, washed with a small amount of water and dried for 4 hours at 40° C. under reduced pressure. Yield: 0.769 g.

The dry residue was extracted in a Soxhlet extractor successively with chloroform and with ethanol.

The alcoholic extract yielded upon evaporation a brown amorphous powder which had a strong long lasting blood pressure lowering action. Yield: 305 mg.

For isolating the active substance in pure state, the powder was chromatographed on 10 g. of aluminum oxide (Woelm neutral, activity degree I). The active substance could be eluted from the column with chloroform/acetone 1:1. It crystallized in the form of light yellow rectangular platelets which were found to melt at 268–270° C. Yield: 41.4 mg.

EXAMPLE 2

800 g. of stems of *Cabucala madagascariensis* were worked up in the manner described in Example 1. The precipitate obtained by the addition of alkali was also extracted with chloroform and methanol. The methanolic fraction was chromatographed on 30 g. of silica gel (Merck, 0.2–0.5 mm., for chromatography). The active fraction could be eluted with benzene/acetone 1:1. It was identical with the product isolated according to Example 1.

EXAMPLE 3

80 kg. of stems of *Cabucala madagascariensis* were extracted with 50 liters of methanol in a large size extractor. The solution was concentrated by evaporation to a volume of 10 liters, the residue was stirred four times with each time 3 liters of petroleum ether in order to remove fats, waxes and sterols. The methanolic solution was filtered off with suction and evaporated under reduced pressure; it yielded an amorphous brown powder (1721 g.). This powder was extracted by intensive stirring for 3 hours at 40–50° C., with 10 liters of 0.5 N-hydrochloric acid. The resulting mixture was filtered and, for further purification, the filtrate was filtered with suction through a filter layer (Seitz filter K3). Solid caustic soda was slowly added to the deep red solution until a pH-value of 8.5 was reached. A yellow brown precipitate separated, which was filtered off with suction and dried. Yield: 45 g. The precipitate was extracted as described in Example 1 with chloroform and methanol. The methanolic extract, which contained the active fraction, was evaporated. Yield: 2.69 g. For purification, the substance was chromatographed on 200 g. of aluminum oxide (Woelm neutral, activity degree I). The active fraction could be eluted with chloroform/acetone 1:1 and crystallized from 96% ethanol in the form of light yellow rectangles. Yield: 1.108 g.

We claim:

1. The pharmaceutically active substance having the following characteristic properties (a) Percentage composition
    carbon _____ 58.3–58.6
    hydrogen _____ 5.8–6.0
    oxygen _____ 28.9–29.2
    nitrogen _____ 6.5–6.7

(b) Melting point: 268°–270° C.;
    (c) Molecular weight: about 252 (osmometrically);
    (d) Ultraviolet spectrum (in methanol): maxima at 244, 304, and 366 m.;
    (e) Infra-red spectrum (in KBr): as in the accompanying drawing.

2. A pharmaceutical composition having blood pressure lowering properties comprising an effective amount of the substance as in claim 1 and a pharmaceutically acceptable carrier.

References Cited

Pichon, Notulae, Systematicae, vol. XIII (1948), pp. 202–203.

JEROME D. GOLDBERG, Primary Examiner